(12) United States Patent
Bircher

(10) Patent No.: US 7,507,973 B2
(45) Date of Patent: Mar. 24, 2009

(54) UV TREATMENT REACTOR

(75) Inventor: Keith G. Bircher, Ontario (CA)

(73) Assignee: Calgon Carbon Corporation, Pittsburgh, PA (US)

( * ) Notice: Subject to any disclaimer, the term of this patent is extended or adjusted under 35 U.S.C. 154(b) by 348 days.

(21) Appl. No.: 11/555,930

(22) Filed: Nov. 2, 2006

(65) Prior Publication Data

US 2008/0121812 A1 May 29, 2008

(51) Int. Cl.
*G01N 21/00* (2006.01)
(52) U.S. Cl. .......................... 250/455.11; 250/453.11; 250/454.11
(58) Field of Classification Search ................. None
See application file for complete search history.

(56) References Cited

U.S. PATENT DOCUMENTS

| | | | | |
|---|---|---|---|---|
| 4,766,321 | A * | 8/1988 | Lew et al. ............... | 250/431 |
| 5,178,758 | A * | 1/1993 | Hwang .................... | 210/256 |
| 5,200,156 | A * | 4/1993 | Wedekamp ............. | 422/186.3 |
| 5,885,449 | A | 3/1999 | Bergmann et al. | |
| 6,500,346 | B1 | 12/2002 | Taghipour et al. | |
| 6,940,075 | B2 | 9/2005 | Schulz | |
| 7,038,219 | B2 * | 5/2006 | Clark et al. ............ | 250/455.11 |
| 7,097,764 | B2 | 8/2006 | Neofotistos | |
| 7,173,254 | B2 * | 2/2007 | Sauska et al. .......... | 250/455.11 |
| 7,175,808 | B2 * | 2/2007 | Gunn et al. ............. | 422/44 |
| 2005/0023482 | A1 | 2/2005 | Schulz | |
| 2005/0092932 | A1 | 5/2005 | Bircher et al. | |

FOREIGN PATENT DOCUMENTS

| | | |
|---|---|---|
| EP | 0 467 465 A1 | 1/1992 |
| EP | 0 746 105 A1 | 11/1996 |
| EP | 0 893 411 A1 | 1/1999 |
| GB | 1 584 385 | 2/1981 |
| WO | 2005087277 A1 | 9/2005 |

* cited by examiner

*Primary Examiner*—David A. Vanore
(74) *Attorney, Agent, or Firm*—Cohen & Grigsby, P.C.

(57) ABSTRACT

An apparatus for treating fluids with UV comprises a housing for receiving a flow of fluid having a fluid inlet, a fluid outlet, a reaction chamber; and an assembly of UV sources positioned substantially perpendicular to the fluid. The assembly includes at least first and second pairs of UV sources located in the reactor chamber. The first pair of UV sources has upper and lower UV sources that are positioned relative to each other at a span that is greater than the span between the upper and lower UV sources in the second pair. The second pair is positioned in either the upstream or downstream flow of fluid such that the plane created by the upper UV sources of each pair of UV sources intersects with the plane created by the lower UV sources of each pair of UV sources Subsequent UV sources or pairs of UV sources may be advantageously used. The apparatus may be combined with a baffle arrangement wherein the baffles are preferably positioned in such a way to direct the fluid now into the treatment area.

19 Claims, 5 Drawing Sheets

Comparative Example

UV TREATMENT REACTOR

FIELD OF THE INVENTION

The present invention relates to an apparatus for treating fluids with ultraviolet ("UV") light, and in particular provides an apparatus that efficiently distributes UV dose so as to achieve increased treatment effectiveness

BACKGROUND OF THE INVENTION

The use of UV radiation to inactivate microorganisms in fluid is known There are several types of UV systems including those that are pressurized, semi-pressurized or not pressurized. Such systems generally rely on lamps positioned in rows submerged in the fluid to be treated, such as drinking water. Regardless of the type of UV system, it is important to deliver as close to an equal amount of UV light (dose or fluence) to all fluid flowing though the system to inactivate any microorganisms. This dose or fluence is equal to the product of the intensity and time. As microorganisms pass though the UV system they are subjected to a range of UV intensities and times resulting in a distribution of doses. Ideally the UV light and flow are distributed evenly across the UV reactor resulting in all microorganisms receiving the same dose. The object in designing UV reactors is to achieve a narrow dose distribution where all fluid elements are exposed as close to this ideal dose as possible.

To achieve such ideal dose distribution, some systems have offset successive rows of UV lamps so that the fluid passes through the spaces between the lamps in the first row and contacts the lamps in the second row. However, a concern in such systems is absorption of UV light by adjacent lamps because light cannot pass upstream and downstream unobstructed. This method can also impose higher headloss and require more lamps, albeit of lower power.

Another method to ensure that the flowing fluid is subjected to a range of UV intensities is to locate a flat baffle parallel to the lamps. In some methods baffles are positioned between each set of UV lamps. The baffles direct the fluid to pass relatively close to the lamp or lamps. This method results in a higher pressure drop through the reactor and leaves zones behind the baffles with low or virtually no flow resulting in high doses in these areas, especially when the UV transmittance of the water is high. It therefore becomes difficult to design a reactor that achieves a narrow dose distribution over the full range of water UV transmittances that the reactor is called on to treat.

Other systems, position lamps in a predominantly circular array to improve UV dose distribution (as shown for example in FIG. 3a). However, even in these systems, and UV systems using similar patterns, there are areas where water does not receive a minimum exposure to the UV fluence rate field. Such systems provide a fluid distribution where some of the fluid receives a low dose of UV and other fluid receives a high dose yielding a wide dose distribution and therefore the potential for microorganisms receiving lower doses to pass though without being inactivated.

Systems configured with a circular array of UV light sources may also tend to lack efficient lamp turndown capabilities. Typically, circular array systems require the system controls to turn off pairs of lamps, rather than lamps individually, to maintain symmetry with as close to an even close distribution as possible. Further, in the circular array, turning off two lamps results in irradiance gaps in the flow stream in areas where the lamps are off, as compared to radiance emitted in areas where the remaining lamps may be close to each other. The uneven dose distribution yields poor efficiency and, in some cases, inadequate treatment levels or untreated water. Some prior systems require large units to administer required doses.

Thus there is a need to eliminate the shortcomings of the prior art including the undesirable effects of a non-uniform treatment dose distribution. It is further desirable to provide a UV reactor that has a compact design, good operating efficiency, efficient flexible turndown when turning lamps off and is low in cost.

SUMMARY OF THE INVENTION

The present invention relates to an apparatus for treating fluids comprising a housing having a fluid inlet, a fluid outlet and a reaction chamber. The reaction chamber contains an assembly of UV sources disposed substantially parallel to one another and substantially perpendicular to the direction of fluid flow. The assembly includes at least two pairs of UV sources, each pair is placed in a plane perpendicular to the direction of fluid flow. The sources in the first pair of UV sources are positioned at a distance between them, or span, relative to each other that is greater than the span between the sources in a second pair of UV sources. The plane created by the two UV sources, one in each of the first and second pairs that are located near a common wall of the reaction chamber (e.g., upper UV sources), intersects with the plane created by the opposing UV sources (e.g., lower UV sources) of the first and second pairs of UV sources. One or more subsequent pairs of UV sources can be added to the assembly positioned along either of the intersecting planes, and a single UV source can be placed at the line where the planes intersect. One or more additional assemblies of UV sources can be contained in the chamber, and one or more chambers each containing one or more assemblies of UV sources can form a UV reactor. Optionally, tipper and lower baffles are positioned upstream of and adjacent to the upper and lower most UV sources, i e., the pair that is closest to the reactor wall.

In this way, the present invention represents a substantial advance over prior UV treatment devices. An embodiment of the invention offers the advantage of a UV reactor for treatment of water that is efficient in design, flexible in operation and relatively low in cost. Another advantage of the invention is to provide an assembly of UV sources wherein the UV Sources are arranged so as to provide a generally uniform dose of UV light being emitted across the cross-section of the reactor, thereby achieving a generally uniform dose, or narrow dose distribution Another object in an embodiment of the present invention is to provide a device having efficient turndown capabilities, i.e., lamps run at reduced or no power to provide efficient turndown. An embodiment of the invention operates with only as many lamps as are needed to achieve a required dose, and can operate with a fewer number of lamps than required in traditional UV reactor systems. It is an object of an embodiment of the present invention to provide an arrangement of baffles that causes the fluid to flow in close proximity to the UV sources, thereby improving dose distribution.

Other objects, features, aspects and advantages of the present invention will become better understood or apparent from the following detailed description, drawings, and appended claims of the invention.

DETAILED DESCRIPTION OF EXAMPLES OF THE INVENTION

Figure 1:
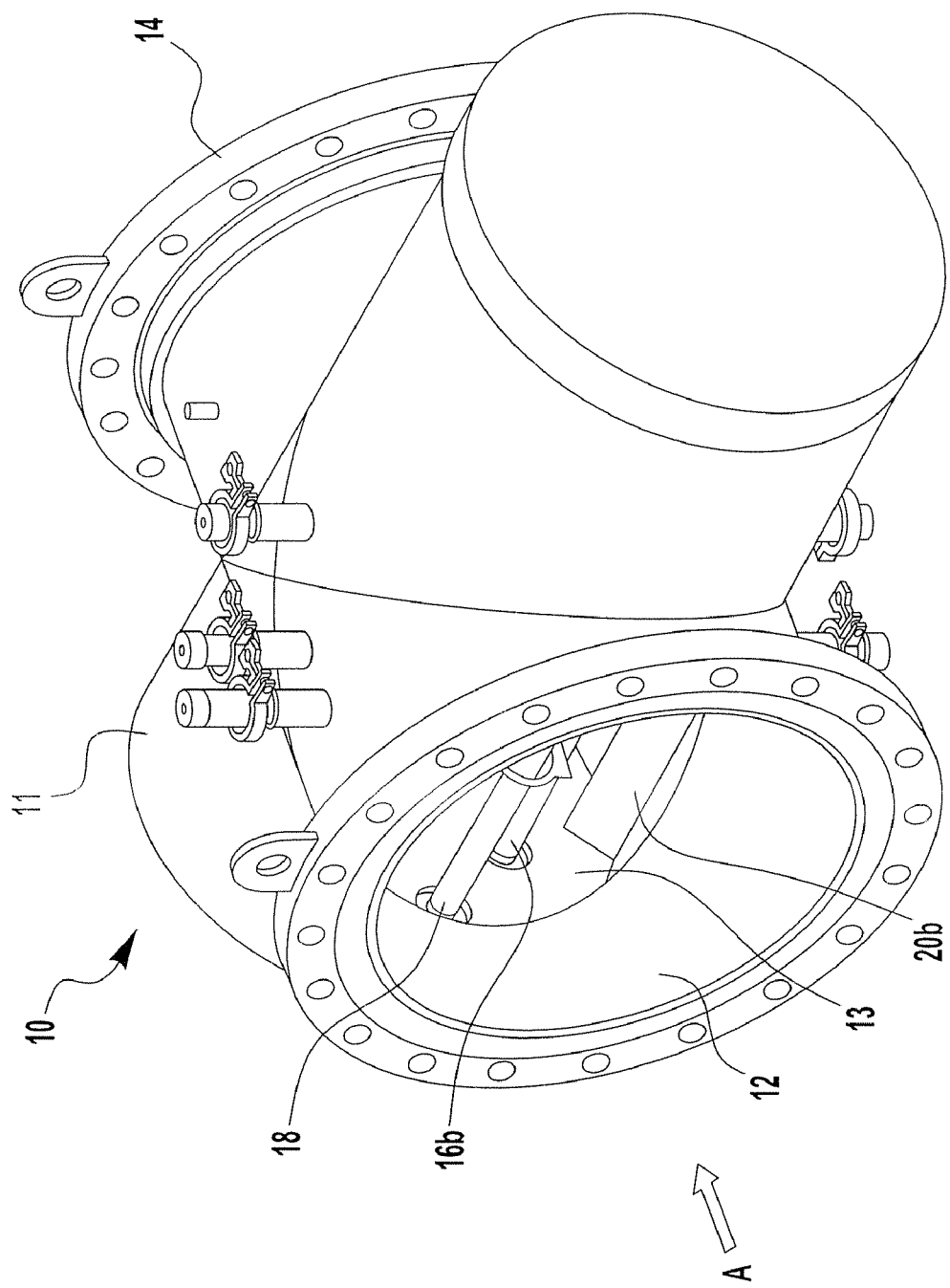
FIG. 1 is an isometric view of a UV reactor in accordance with aspects of the present invention.
Figure 2:
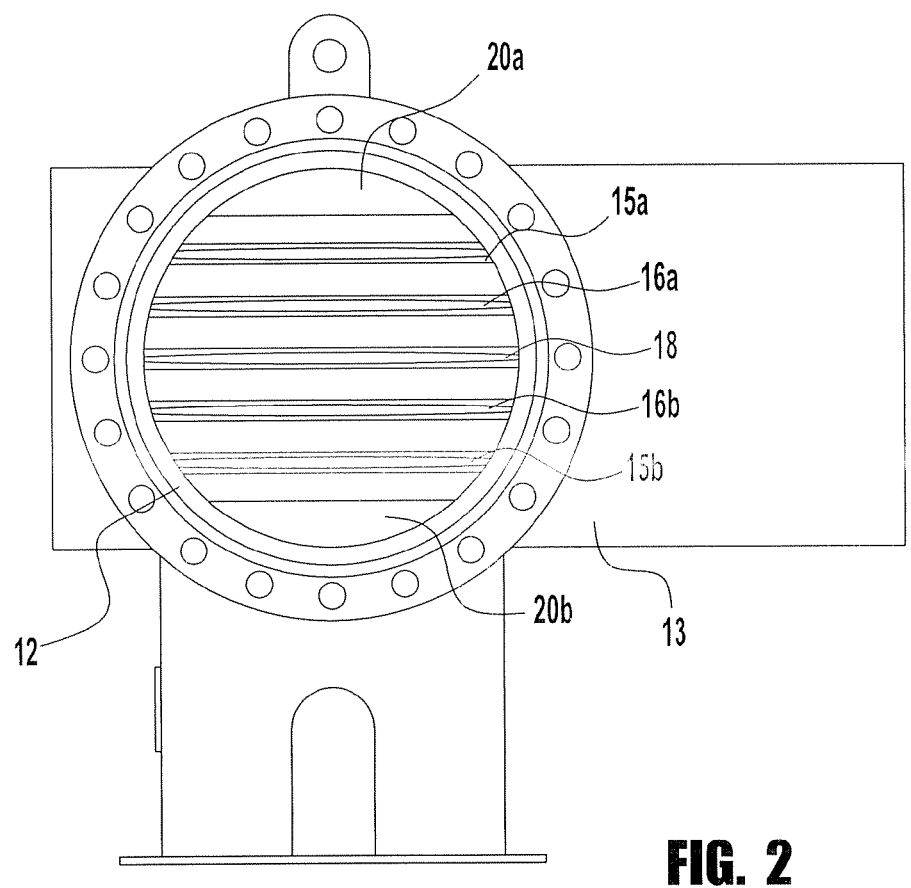
FIG. 2 is a front elevation cross sectional view of an embodiment of the present invention.
Figure 4:
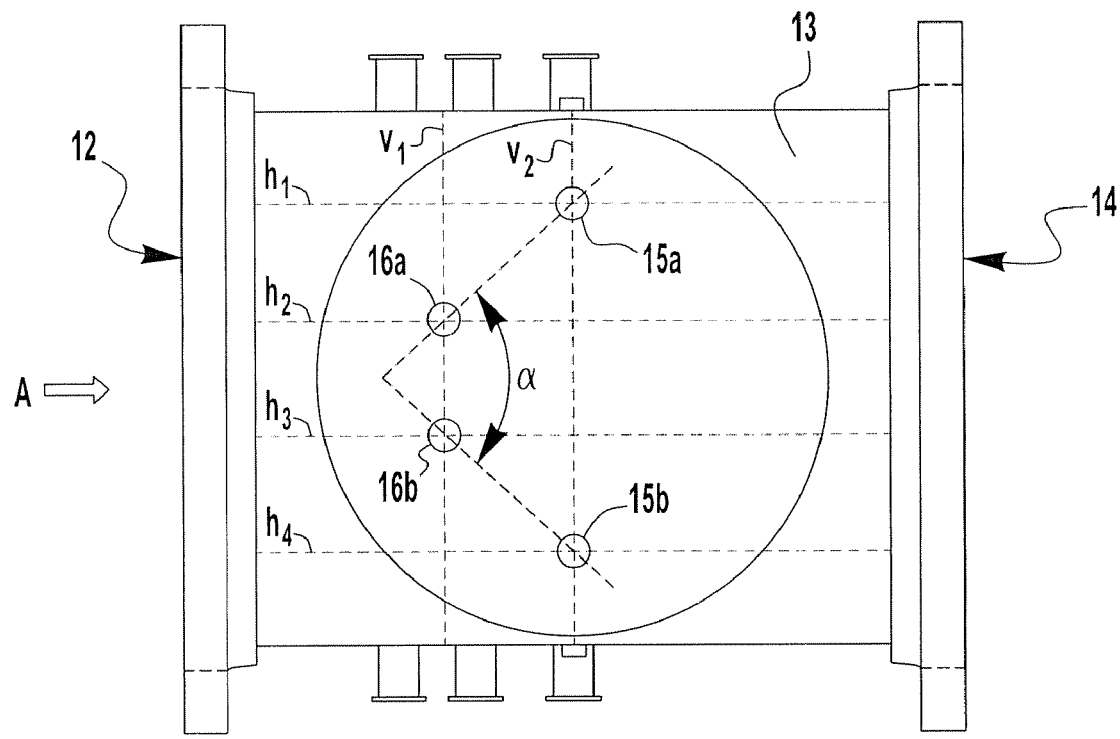
FIG. 4 is side elevational view of a cross section of a reactor showing an assembly of UV sources arranged according to an embodiment of the present invention.

A fluid treatment device according to the present invention is illustrated for example in FIGS. 1, 2 and 4. The fluid treatment device 10 comprises a housing 11 that receives a flow of fluid. The direction of the flow is indicated by arrow A The housing comprises a fluid inlet 12 into which the fluid flows, a reaction chamber 13 for treating fluid and a fluid outlet 14 out of which the treated fluid flows. Reaction chamber 13 contains a first assembly comprising at least two pairs of UV sources 15 and 16. First pair 15a, 15b and second pair 16a, 16b are positioned parallel to each other and perpendicular to the fluid flow. UV sources 15a, 15b of the first pair are separated from each other at a span that is greater than the span separating each of UV sources 16a, 16b. As used herein the term "span" refers to the distance between two lamps in a pair. For illustrative purposes, each pair is shown for example in FIG. 4 along a dashed vertical line, $V_1$, $V_2$. The span is the distance along that vertical line between lamps. First and second pairs are aligned so that one source of the first pair (e.g., the upper source) and the source of the second pair that is located closer to a common side of chamber 13 as the one of first pair (e.g., also the upper source) form a plane. Together with the respective second sources of each, both pairs create two substantially intersecting planes.

UV sources 15a, 15b and 16a, 16b are UV lamps, preferably, medium pressure mercury are UV lamps. Alternatively they are low pressure UV lamps, pulsed UV lamps, UV light emitting diodes (UVLEDs) or any other UV source. The UV sources are usually contained within a quartz tube or sleeve to seal them from the fluid.

As shown for example in FIG. 4, the second pair of UV sources 16a, 16b is disposed nearer to the inlet 12 than first pair of UV sources 15a, 15b. The UV sources 15a, 15b and 16a, 16b are spaced apart in the housing at a distance sufficiently far such that the velocity of fluid between them is not high enough to achieve excessive pressure drop in the reactor, but is sufficiently close such that the UV fluence is not too low to achieve an adequate dose for fluid at the point furthest from the lamps. As used herein the term "distance" refers to the distance between one lamp alone or a pair of lamps and another pair of lamps (discussed below) in the direction of fluid flow This distance is shown for illustrative purposes by the dashed vertical lines, $v_1$ and $v_2$ in FIG. 4. The distance from the first pair of UV sources 15a, 15b and the second pair of sources 16a, 16b is approximately 0.2 and 1.25 times the increase in span between UV sources 15a, 15b and UV sources 16a, 16b. In the example of a reactor with 2 pairs of lamps (FIG. 4), the span between the second pair of UV sources 16a, 16b is about one-third the span between the first pair of UV sources 15a, 15b. In this way the span between lamps 15a and 16a is the same as that between 16a and 16b and also the same as that between 16b and 15b. This is done so that fluid flowing horizontally at the mid-point between lines $h_1$ and $h_2$ receives about the same dose as fluid traveling at the midpoint between lines $h_2$ and $h_3$ and also as that fluid between $h_3$ and $h_4$. In other examples with 5 lamps (FIG. 5), the span between the second pair of UV sources 16a, 16b must be about one-half of the span between the first pair of UV sources 15a, 15b, and with 6 lamps (FIG. 6) about three-fifths; to maintain the same spacing between successive horizontal lines $h_1$, $h_2$, etc. And therefore provide a generally even dose distribution.

This positioning of the assembly of lamps permits the fluid to flow in a generally unimpeded fashion between UV sources, but not so far as to allow the fluid that passes furthest from the UV sources to wander far away from the other UV sources, which would cause the fluid to receive an insufficient dose. Therefore, the angle between the two planes of UV sources formed by the upper set of UV sources 15a, 16a and the lower set of UV sources 15b, 16b, as shown by angle α in FIG. 4, can be roughly from 40 degrees to 140 degrees. These angles and distances at which the lamps and respective sleeves are disposed to one another is the lamp geometry. Alternately, a second set of UV sources 16 is located downstream of and further from inlet 12 than first set 15, still at a shorter span than first set 15 and providing angle α.

Figure 5:
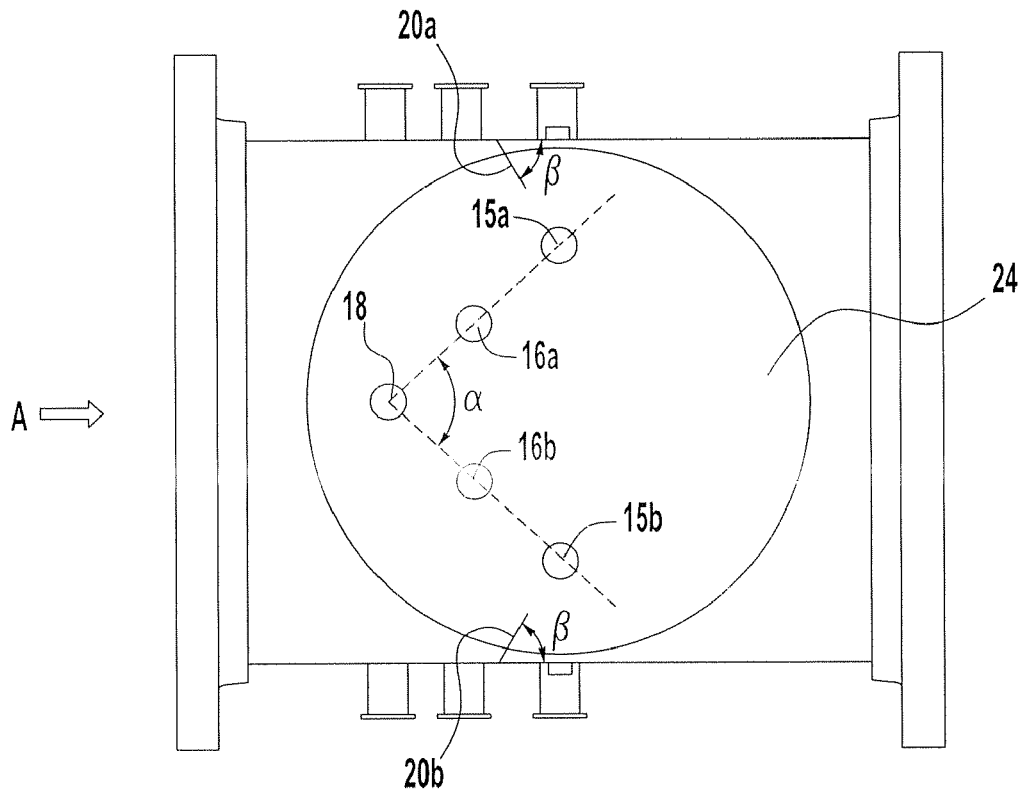
FIGS. 5-7 illustrate additional side elevational views of a cross section of a reactor containing an assembly of UV sources and pairs of UV sources arranged according to other embodiments of the present invention.
Figure 6:
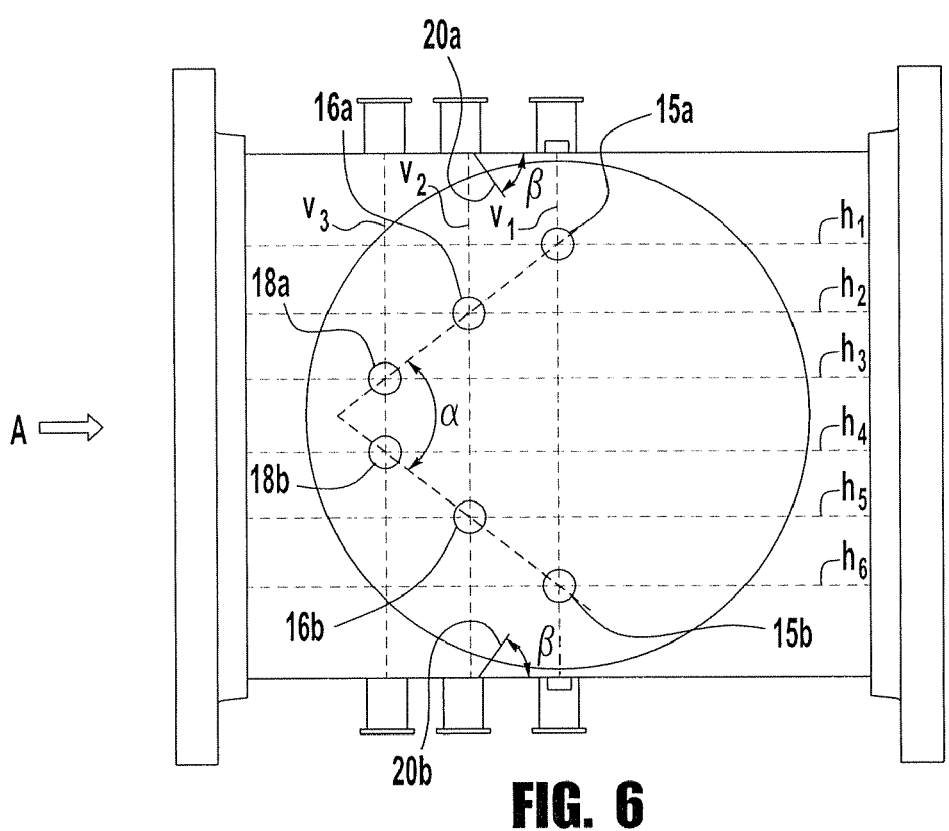

Another embodiment of device 10 further includes an additional UV source 18 positioned perpendicular to the direction of fluid flow A, as illustrated for example in FIG. 5. Optionally, UV source 18 consists of a third pair of UV Sources, 18a, 18b, as illustrated in FIG. 6, disposed substantially parallel to one another and spaced at a shorter span from each other relative to the span between the first and second pairs of UV sources 15a, 15b and 16a, 16b. In an example, third pair of UV sources 18a and 18b are positioned upstream of first and second pairs of UV sources 15a, 15b and 16a, 16b.

Figure 7:
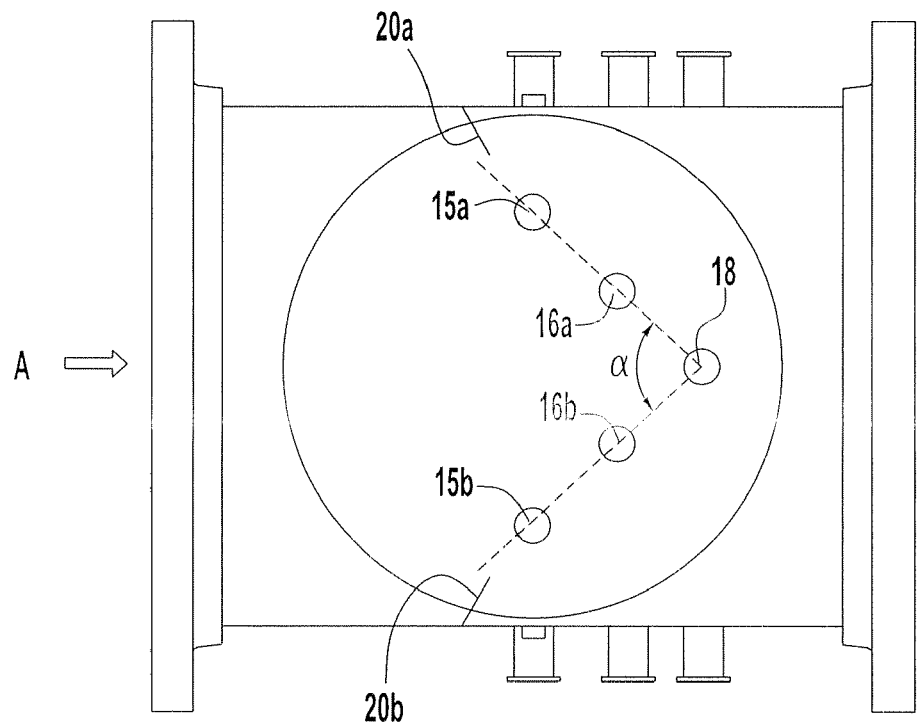

In a preferred embodiment the third pair of UV sources 18a and 18b are spaced at a distance from the second pair of UV sources 16a, 16b that is approximately equal to the distance between the first pair of sources 15a, 15b and second pair of sources 16a, 16b. Thus upper sources of each pair 18a and 16a, and 16a and 15a are disposed at approximately equal distances between each other, as are their respective lower pairs 18b and 16b, and 16b and 15b. Alternatively, the third pair of UV sources 18a and 18b are not spaced at a distance from the second pair of UV sources 16a, 16b that is equal to the distance between the first pair of sources 15a, 15b and second pair of sources 16a, 16b. This distance can be anywhere from zero (i.e., 18a and 18b in the same vertical plane as 16a, 16b) to two times the distance between the first pair of sources 15a, 15b and second pair of sources 16a, 16b without significantly effecting dose distribution and hence performance. However, the span must be approximately one-third the span between 16a and 16b and one-fifth the span between 15a and 15b. In a preferred embodiment, UV source 18 is disposed within the assembly of UV sources 15a, 15b and 16a, 16b at the point of intersection of the two planes, with angle α, to form an array of UV sources and pairs of UV sources that resembles a "chevron" pattern. The apex of the chevron points upstream into the fluid flow, as shown in FIG. 5, or, in another arrangement as shown in FIG. 7, downstream with the flow of fluid A. The third UV source 18 is not necessarily at the point of intersection of the two planes. The distance between UV source 18 and the second pair of UV sources 16a, 16b can be anywhere from zero (i.e., 18 in the same vertical plane as 16a, 16b) to two times the distance between the first pair of sources 15a, 15b and second pair of sources 16a, 16b without significantly effecting dose distribution and hence performance. The span between 16a and 16b must be approximately one-half the span between 15a and 15b.

Subsequent UV sources and/or pairs of lamps spaced at substantially equal distances and decreasing spans may optionally be added to the chevron configuration for use in the reactor For example, an additional single UV source can be positioned upstream (with the chevron pointing upstream) or down streaming (with the chevron pointing downstream) of the third pair of UV sources and at a distance from the third pair of UV sources that is between zero and two times the distance between the first and second pairs of UV sources. In another example, a fourth pair of UV sources is positioned upstream or downstream of the third pair of UV sources. The fourth pair is positioned at a distance from the third pair of UV sources between zero and two times the distance between said first and second pairs of UV sources and having a span between the sources of said fourth pair of UV sources less than the span between the sources of said third pair of UV sources. In another example using at least four pairs of UV sources, the span between the second pair of UV sources is approximately five-sevenths the span between the first pair of UV sources, the span between the third pair of UV sources is approximately three-sevenths the span between the first pair of UV sources, and the span between the fourth pair of UV sources is approximately one-seventh the span between the first pair of UV sources.

Optionally, as shown in FIG. 5, chamber 13 includes an upper baffle 20a and a lower baffle 20b. In a preferred embodiment, upper and lower baffles 20a and 20b are positioned upstream of and adjacent to the UV sources 15a, 15b, which are the UV sources positioned at the greatest span and nearest to the top and bottom sides of reaction chamber 13, respectively. The diverters or baffles 20a and 20b are arranged to divert the flow of fluid to UV sources 15a, 15b so as to ensure adequate dose is received by fluid traveling along the top and bottom of the reaction chamber 13. The geometry of the lamp assembly and baffles act as a diversion mechanism to direct the flow of fluid so as to increase uniformity in dose distribution by causing the fluid to flow into an area where it will receive uniform treatment. The span between the trailing or innermost edge of the upper and lower baffles 20a and 20b is larger than the span between UV sources 15a, 15b by approximately one-quarter the increase in span between successive pairs of UV sources 16a, 16b, and 15a, 15b. However the span between the trailing or innermost edge of the upper and lower baffles 20a and 20b can be larger than the span between UV sources 15a, 15b by between approximately 0.1 and 0.5 times the increase in span between successive pairs of UV sources 16a, 16b and 15a, 15b. The trailing or innermost edges of the upper and lower baffles 20a and 20b are positioned horizontally such that the distance from the trailing or inner most edge to UV sources 15a, 15b is less than approximately half the horizontal distance between successive pairs of UV sources 16a, 15a, and 16b, 15b. Baffles 20a and 20b can be angled at about 90 degrees to each of the opposing reaction chamber walls (depending upon orientation, top and bottom walls), depicted by angle β in FIG. 5. More preferably, angle β is between 20 and 90 degrees. In the preferred embodiment as shown in FIGS. 5 and 6, angle β is 45 degree and such that the plane formed by the baffle intersects with UV sources 15a, 15b respectively.

Figure 8:
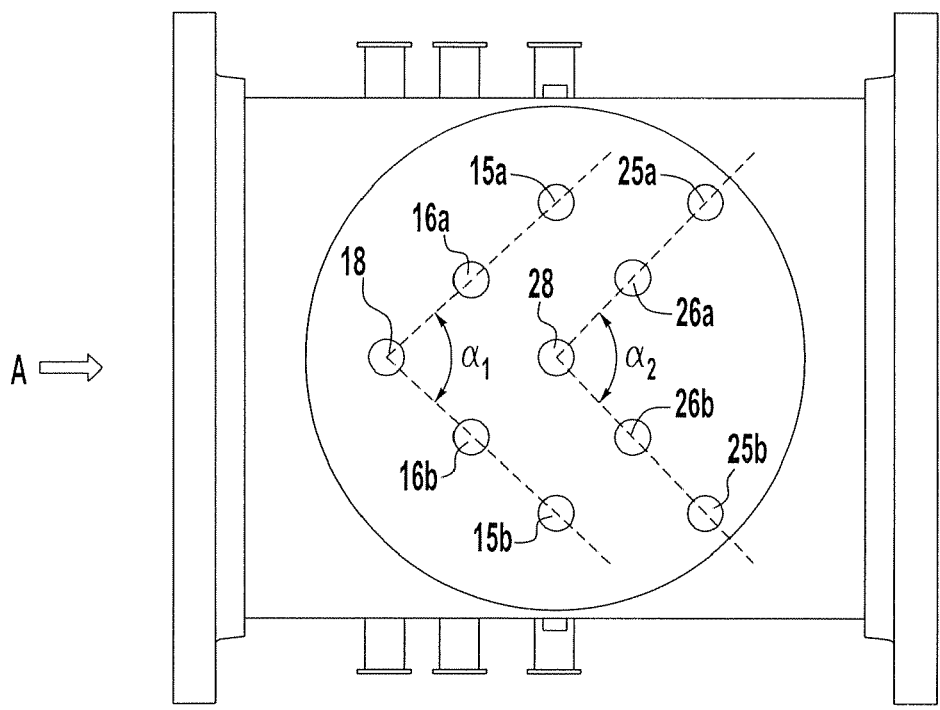
FIG. 8 illustrates a side elevation of a reactor showing two assemblies of UV sources and pairs of UV sources in another embodiment of the present invention.

Another embodiment comprises two assemblies of UV sources. Both assemblies can be disposed in same reaction chamber 13. As shown for example in FIG. 8, each assembly comprises five UV sources, and point upstream. The second assembly need not have the same number of UV sources as the first, but is generally arranged following the same principles as the first to have decreasing spans and form two intersecting plans.

The assembly of UV sources is designed such that the fluid is evenly distributed and thus uniformly exposed to UV light to provide a narrower dose distribution than traditional UV reactors and yield relatively good efficiency.

The controlled flow of fluid offered by an embodiment provides for identical hydraulics regardless of whether all UV sources comprise working UV sources. Thus, to minimize costs, not all four, five, six or ten UV sources (in the embodiments shown in FIGS. 4 through 8) contain lamps that would necessarily need to be supplied or turned on. This is an attractive option in view of the high cost of validation testing of these reactors in accordance with a standardized test method such as that proscribed in the UVDGM[1]. For this testing, the reactor must be validated at all possible combinations of operational parameters, including: flow, lamp power, water UV transmittance and number of lamps turned on. For this reason, it is more cost effective to validate a single reactor configuration, for example with all five quartz tubes and lamps installed (15a, 15b, 16a, 16b and 18), and supply a UV reactor for a water treatment plant with between one and five lamps installed in the quartz tubes, thereby minimizing the cost of validation and reducing the cost of systems if less than the full compliment of five lamps is needed. [1]US EPA UV Disinfection Guidance Manual, Draft April 2006

Furthermore, when all five UV lamps are supplied, the device has improved turndown capabilities because it can operate efficiently with only as many lamps as needed. This way, as the reactor has been validated with between one and five of the five installed lamps operating, lamps can be turned off to save on electrical power and lamp maintenance costs.

Figure 3A:
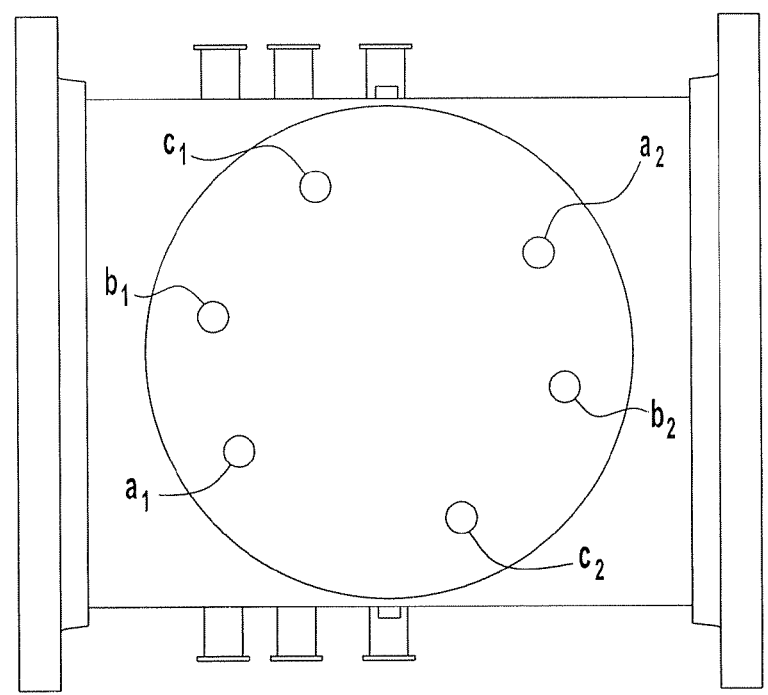
FIG. 3a is a side elevational view of a cross section of a reactor using a traditional circular array of UV sources.

Device 10 is capable of operating with a fewer number of lamps than required in traditional UV reactor systems thereby decreasing the operational costs from those of traditional systems. For instance, it eliminates the need of prior art reactors to turn off lamps in pairs to maintain symmetry required for an even dose distribution. In the traditional circular array (shown for illustration in FIG. 3a), turning off two lamps produces gaps in the flow stream where the lamps are off and consequent under dosing. The remaining operating lamps are close to each other with consequent high irradiance and overdosing, resulting in an uneven dose distribution and hence poor efficiency.

In addition to the flexibility offered by the present invention in that lamps may be turned off to achieve one, two, three, four, or five lamps operating, rather than in pairs to only achieve 2, 4 or 6 lamps operating, the present invention does this while maintaining good dose distribution and better operating efficiency. During operation, if the flow rate through the reactor is low or the water quality is high, not all of the UV sources need to be operated thereby reducing the cost of operating the reactor. This high degree of turndown in the reactor is attractive both in sizing the reactor for a given application and in operating the reactor to reduce operating costs. The validation testing mentioned above results in a set of operating equations whereby the necessary irradiance to achieve a specific dose can be calculated with any number of lamps operating. This dose then corresponds to the log-inactivation of a specific target organism. Hence at reduced flow or at high water UV transmittance, the lamp power of the remaining operating lamps can be reduced to achieve the necessary irradiance in the water as measured by a UV sensor further reducing costs. Although turning off lamps results in a wider spacing between lamps than traditional systems, the unique arrangement of the present invention enables a dose distribution that is still more even and therefore more effective.

This is particularly so if only two lamps in a five lamp embodiment are needed to achieve the required dose. In such an embodiment lamps 16a and 16b would remain on and lamps 18, 15a and 15b would be extinguished. These two lamps are placed symmetrically in the flow of fluid with one lamp 18 disposed between them and one lamp 15a above and one lamp 15b below, thereby maintaining even dose distribution at higher UV transmittance and/or lower flow. In a circular array, with six lamps for instance, leaving two lamps on results in either a larger gap in the center of the reactor if lamps $a_1$ and $a_2$, remain on or two gaps in the top and bottom of the reactor if the two adjacent lamps $b_1$ and $b_2$ remain are left on. In both instances, the result is an uneven dose distribution.

Furthermore the unique arrangement of UV sources 15a, 15b, 16a, 16b and 18 eliminates the need of many comparative reactors that require up to three banks in series. For instance, other devices require up to three banks containing two or three lamps each. Such multi-bank reactors may have fairly good turndown and efficiency, but are longer and therefore bulky and more costly. Another drawback of reactors with multiple banks in series is that they need larger flow diverters to bring the fluid into proximity with the fewer number of lamps in each bank, resulting in a higher fluid velocity and hence pressure drop than that of the present invention. The present invention provides efficient results with just one fluid treatment zone or bank of lamps.

EXAMPLE 1

Figure 3B:
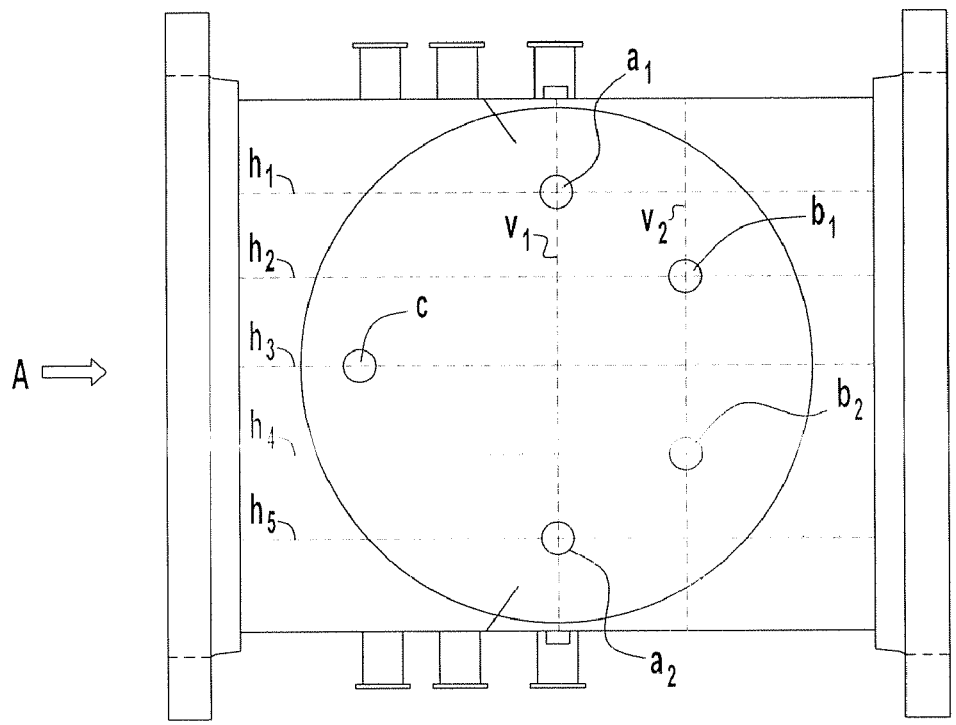
FIG. 3b shows a side elevation view of a cross section of a reactor using five lamps in a circular array.

A reactor with a typical circular array was modified for comparison with an embodiment of the present invention. Such reactors require at least six or more lamps. For purposes of comparison with the present invention, a reactor having a "circular array" was prepared to contain a UV lamp geometry using only five lamps as illustrated in FIG. 3b. In this array of lamps, $b_1$ and $b_2$ are positioned downstream of UV sources $a_1$ and $a_2$ to effect an essentially circular array as compared to a five lamp reactor in the chevron array as embodied in FIG. 5. The span between the lamp pairs was maintained. Computational Fluid Dynamic (CFD) modeling combined with fluence field modeling was used to determine the performance of this reactor when operating with five lamps and with four lamps. Similar tests were conducted on an embodiment of the present invention using five lamps arranged in a chevron pattern as shown in FIG. 5. The results were compared and are summarized in Table 1 below.

TABLE 1

| Flow, MGD | 6.2 | 4.9 |
|---|---|---|
| UV Transmittance | 80 | 80 |
| No of Lamps operating | 5 | 4 |
| Dose with Chevron pattern | 51.4 | 31.7 |
| Dose with circular pattern | 43.4 | 27.6 |
| % Reduction in dose | −16% | −13% |

The results of the comparison demonstrated the effectiveness of the present invention in view of a circular arrangement using five lamps. With five lamps operating, a flow rate of 6.2 million gallons per day (MGD) and a water UV transmittance of 80%, the chevron configured reactor of the present invention resulted in a UV dose delivered to organisms residing in the water fluid flow of 51.4 mJ/cm². By contrast, the lamp array arrangement of the device shown in FIG. 3b resulted in a dose of 43.4 mJ/cm² using the same conditions of flow and water transmittance. With four lamps operating (lamp 18 extinguished FIG. 5, lamp c extinguished FIG. 3B) and a flow of 4.9 MGD, 80% transmittance, the dose was 31.7 mJ/cm² with the chevron array, whereas the dose was only 27.6 mJ/cm² with the five lamp circular array. This is a reduction in performance of 16% and 13% with five lamps and four lamps respectively with the circular array compared to that of the present invention with the chevron array.

Thus, the data above shows an improvement of 16% when the reactor is run in a chevron array over that with a five lamp circular array. This would indicate that the five lamps in a chevron array would have the equivalent performance of 5.8 lamps (5×1.15) in a circular array. It is therefore expected that five lamps arranged in a chevron pattern according to an embodiment of the present invention would run almost as well as a circular array with six lamps

EXAMPLE 2

In an example of the invention, reactor 10 with five UV lamps arranged in a substantially chevron configuration according to this invention was modeled using Computational Fluid Dynamic Modeling to predict performance. The results are summarized in Table 2.

TABLE 2

| Flow, MGD | 10. | 8. | 6. | 4. | 2. |
|---|---|---|---|---|---|
| UV Transmittance, % | 87 | 90 | 90 | 92 | 95 |
| No of Lamps operating | 5 | 4 | 3 | 2 | 1 |
| Dose required, mJ/cm² | 40 | 40 | 40 | 40 | 40 |
| Actual Dose (CFD Modeling) at 10 kW/lamp | 44.4 | 46.6 | 48.9 | 46.5 | 46.7 |
| Lamp power to achieve 40 Dose (CFD Modeling), kW | 9.3 | 8.7 | 8.4 | 8.5 | 8.9 |

With five lamps operating at 10 million gallons per day (MGD) flow and a UV transmittance of 87%, a dose of 44.4 mJ/cm² is achieved. The lamps can be turned down to 9.3 kW/lamp to achieve the required 40 mJ/cm² dose. Alternate lamps were turned off, one lamp or pair of lamps at a time, to demonstrate turndown efficacy. First, the front lamp 18 was turned off to provide four operating lamps. These lamps were sufficient in the situation at a flow rate of 8 MGD and UV transmittance of 90% Such that only four lamps are needed to provide sufficient dose. Next, the second pair of lamps 16a and 16b were turned off with lamp 18 turned back on leaving three operating UV lamps. A three lamp scenario can be acceptable if, for example, the flow rate is 6 MGD with a UV transmittance of 90% to achieve reater than 40 mJ/cm² UV dose and hence disinfection of the target microorganisms. Additionally, the supply of a device with only three of the five possible lamps installed is anticipated to enable a more efficient, less costly device than a comparative four lamp design needed in a traditional circular array when the design (peak) flow and UV Transmittance are such that only three lamps are needed to achieve the desired dose. Next, both the front lamp 18 and the first pair of lamps 15a and 15b were turned off leaving two operating lamps which is effective at further reduced flow of 4 MGD in this example and UV transmittance of 92%. Finally, all the lamps but the front lamp 18 were turned off leaving just one operating lamp. This scenario resulted in the maximum turndown and with these conditions only one lamp can achieve the required dose with a flow of 2 MGD and 95% transmittance. As demonstrated by this example, the present invention provides a UV treatment device with UV lamps that are specifically symmetrically arranged in the water in a design that results in a good dose distribution and efficiency for fluid being treated therein.

An additional advantage of the present invention is the fact that the lamps are concentrated in one half of the circular end plate that provides Support for the insertion of the lamps and quartz tubes that form the UV sources. This leaves the other half uncluttered for the inclusion of a hand hole that can be removed to provide access to the reactor's internals for maintenance. In reactors with circular arrays there is less free space for a hand hole making it more difficult to service.

When using a larger reactor with UV sources of relatively larger arc length, optionally in an example, the bottommost UV source 15b operates at a power level higher than that of other lamp UV sources 16, 18a, 18b and 15a to compensate for the relatively lower irradiance that the lamp irradiates downwards compared to that upwards. The larger the arc length the greater the advantage the inventors anticipate this would provide.

Additionally, instead of arranging the lamps in a perfect chevron or "V" array, they could be arranged with lamps 16a, 16b moved further upstream (FIGS. 5,6) or downstream (FIG. 7) to form more of a semi-circle or "C" shape. i.e., while the increase in span between successive lamps or pairs of lamps must be more or less uniform to evenly distribute the UV light, the distance between lamp(s) 18 and 16a, 16b could be half or twice the distance between 16a, 16b and 15a, 15b without significantly effecting the distribution of UV light. Additionally, while it may be most efficient to maintain a strictly uniform increase in span between successive lamps or pairs of lamps for operation with 5 lamps, the preferred embodiment of the invention increases the span of lamps 16a, 16b by up to 10% while decreasing the span of lamps 15a, 15b by up to 10% to improve the dose distribution and hence performance with jgiust two lamps (16a, 16b) or 3 lamps (18, 15a, 15b) respectively. This can be done with little sacrifice in the performance with 5 lamps operating.

While presently preferred embodiments of the invention have been shown and described, it is to be understood that the detailed embodiments and Figures are presented for elucidation and not limitation. The invention may be otherwise varied, modified or changed within the scope of the invention as defined in the appended claims. In addition, one skilled in the art would recognize that the present reactor could be mounted vertically such that the fluid flows upwards vertically or downwardly. If such an orientation is used the use of the terms vertical and horizontal, and upper and lower in the above examples would be interchanged. There is no limit to the number of lamps that could be used to form the two substantially intersecting planes, such as the chevron array, described herein. Additionally successive fluid treatment zones each containing intersecting planes of lamps could also be used to achieve larger doses if that is desired for a particular application.

What is claimed is:

1. A fluid treatment device comprising:
    a. a reactor for treating a flow of fluid, said reactor having a fluid inlet, a fluid outlet, and at least one chamber therebetween; and
    b. at least one assembly of UV sources disposed in said chamber, said at least one assembly including at least two pairs of UV sources, each pair of UV sources comprising an upper and lower UV source, a first pair of said UV sources wherein said UV sources are positioned relative to each other at a span greater than the span between the UV sources in a second pair of said UV sources, said second pair being positioned in either the upstream or downstream flow of fluid wherein the plane created by the upper UV sources of each said pair of said UV sources intersects with the plane created by the lower UV source of each said pair of UV sources, said UV sources being positioned substantially perpendicular to the direction of fluid flow.

2. A fluid treatment device according to claim 1, wherein said device further comprises two baffles attached to the upper and lower chamber walls, an upper baffle disposed above and adjacent to the upper UV source of said first pair of UV sources and a lower baffle positioned below and adjacent to the lower UV source of said first pair of UV sources.

3. A fluid treatment device according to claim 1, wherein said device further comprises an additional single UV source positioned upstream or downstream of said second pair of UV sources and opposite said first pair of UV sources at distance from the said second pair of UV sources between zero and two times the distance between said first and second pairs of UV sources.

4. A fluid treatment device according to claim 1, wherein said device further comprises a third pair of UV sources positioned upstream or downstream of said second pair of UV sources and opposite said first pair of UV sources at distance from said second pair of UV sources between zero and two times the distance between said first and second pairs of UV sources and having a span between the sources of said third pair of UV sources less than the span between the sources of said second pair of UV sources.

5. A fluid treatment device according to claim 1, wherein said span between said second pair of UV sources is approximately one-third of the span between the said first pair of UV sources.

6. A fluid treatment device according to claim 3, wherein the span between said second pair of UV sources is approximately one-half of the span between said first pair of UV sources.

7. A fluid treatment device according to claim 4, wherein the span between said second pair of UV sources is approximately three-fifths of the span between said first pair of UV sources, and the span between said third pair of UV sources is approximately one fifth of the span between said first pair of UV sources.

8. A fluid treatment device according to claim 4, wherein said device comprises an additional single UV source arranged together with the assembly of UV sources positioned upstream or downstream of said third pair of UV sources at a distance from said third pair of UV sources between zero and two times the distance between said first and second pairs of UV sources.

9. A fluid treatment device according to claim 4, wherein said device comprises a fourth pair of UV sources arranged together with the assembly of UV sources positioned upstream or downstream of said third pair of UV sources at a distance from said third pair of UV sources between zero and two times the distance between said first and second pairs of UV sources and having a span between the sources of said fourth pair of UV sources less than the span between the sources of said third pair of UV sources.

10. A fluid treatment device according to claim 8, wherein the span between said second pair of UV sources is approximately two-thirds of the span between said first pair of UV sources, and the span between said third pair of UV sources is approximately one-third of the span between said first pair of UV sources.

11. A fluid treatment device according to claim 9, wherein said span between said second pair of UV sources is approximately five-sevenths of the span between said first pair of UV sources, and the span between said third pair of UV sources is approximately three-sevenths of the span between said first pair of UV sources, and the span between said fourth pair of UV sources is approximately one-seventh of the span between said first pair of UV sources 12. A fluid treatment device according to claim 1, wherein said UV sources comprise medium pressure UV lamps, low pressure UV lamps, pulsed UV lamps, UV light emitting diodes, or a combination thereof.

13. A fluid treatment device according to claim 1, wherein said device further comprises a second assembly of UV sources disposed in said chamber, said second assembly including at least two pairs of UV sources, a first pair of said UV sources wherein said UV sources are positioned relative to each other at a span greater than the span between the UV sources in said second pair of said UV sources, said second pair being positioned in either the upstream or downstream flow of fluid wherein the plane created by the upper UV sources of each said pair of said UV sources intersects with the plane created by the lower UV sources of each said pair of UV sources, said UV sources being positioned substantially perpendicular to the flow of fluid.

14. A fluid treatment device according to claim 1, where the distance between said first pair of UV sources and said second pair of sources is in the range of about 0.2 to 1.5 times the increase in span from said second pair of UV sources to said first pair of UV sources.

15. A fluid treatment device according to claim 1, wherein the angle between said two substantially intersecting planes is from about 40 degree to 140 degree.

16. A fluid treatment device according to claim 2 wherein each said baffle is angled at about 20 to about 90 degree from an opposing reaction chamber wall.

17. A method for treating fluids using a fluid treatment device according to claim 1, said method comprising flowing fluid through said device and exposing said fluid to said UV sources, wherein not all said UV sources are operating, and not all said UV sources contain UV lamps.

18. A method for treating fluids using a fluid treatment device according to claim 3, said method comprising flowing fluid through said device and exposing said fluid to said UV sources, wherein one, two, three, four or five of said UV lamps are operating.

19. A method for treating fluids using a fluid treatment device according to claim 4, said method comprising flowing fluid through said device, exposing said fluid to said UV sources and turning off one or two pairs of said UV sources.

* * * * *